United States Patent [19]

Steffen

[11] 4,166,948
[45] Sep. 4, 1979

[54] SEED SENSOR

[75] Inventor: David E. Steffen, Chatham, Ill.

[73] Assignee: Dickey-john Corporation, Auburn, Ill.

[21] Appl. No.: 856,289

[22] Filed: Dec. 1, 1977

[51] Int. Cl.² ............................................ H01J 39/12
[52] U.S. Cl. .......................... 250/214 B; 250/222 R; 250/223 R
[58] Field of Search ........ 250/214 RC, 214 B, 214 R, 250/214 P, 222, 223

[56] References Cited

U.S. PATENT DOCUMENTS

| | | | |
|---|---|---|---|
| 3,813,540 | 5/1974 | Albrecht | 250/214 RC |
| 3,974,377 | 8/1976 | Steffen | 250/222 R |

Primary Examiner—David C. Nelms
Assistant Examiner—Darwin R. Hostetter
Attorney, Agent, or Firm—Trexler, Wolters, Bushnell & Fosse, Ltd.

[57] ABSTRACT

A seed sensor detects seeds passing through a chute or housing forming a path of travel for seeds dispensed from a seed planter. A source of light such as a light emitting diode is optically exposed to the path of travel and a photosensitive element such as one or more photoresponsive transistors is optically exposed to the path of travel for receiving the light from the light source. An electronic circuit is connected with the photosensitive element for producing an electrical signal responsive to the light level incident thereupon and producing a change in the electrical signal in response to a momentary change in light level due to the passage of a seed. The electronic circuit includes a circuit element such as a diode connected with the photosensitive element for maintaining at least a given amount of change in the electrical signal output level in response to a given change of light level corresponding to passage of a seed. The circuit therefore is substantially unaffected by any change in the level of light transmitted from the light source or received by the photosensitive element not caused by passage of a seed, as for example due to the accumulation of dirt or dust partially obscuring either the light source or the photosensitive element.

5 Claims, 4 Drawing Figures

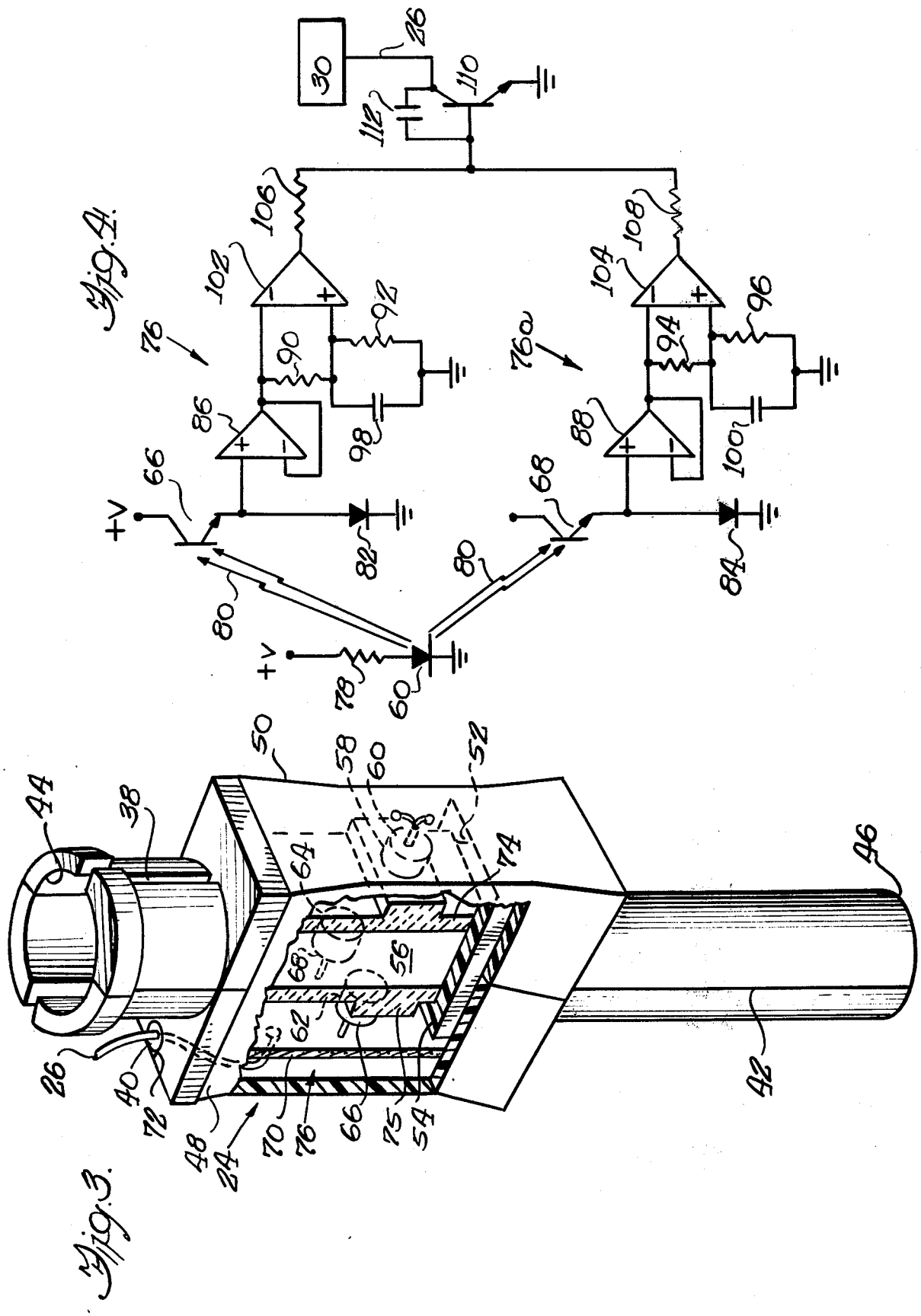

4,166,948

SEED SENSOR

BACKGROUND OF THE INVENTION

This invention relates to monitoring apparatus, and more specifically to a novel sensor apparatus for monitoring the passage of discrete articles such as seeds or the like. While features of this invention may be applicable to a variety of uses, the disclosure will be facilitated by addressing the problem of monitoring the passage of seeds as dispensed by a seed planter.

A farmer engaged in mechanized planting of various seeds generally utilizes a seed planter or planting machine pulled behind a tractor. Such a seed planter usually includes apparatus capable of simultaneously planting a plurality of rows of seeds supplied from one or more hoppers. Generally speaking, a plurality of seed delivery tubes or conduits are associated with the seed planting apparatus, one such concuit or seed delivery tube for each row of seeds to be planted. The prior art includes many monitoring devices having seed sensors associated with the individual seed delivery conduits for detecting or monitoring the passage of seeds therethrough. One known especially useful and successful sensor device comprises a light source such as a light emitting diode optically aligned with one or more photosensitive elements such as photoresponsive transistors connected in a circuit so as to emit an electrical signal responsive to momentary changes in the light level incident thereon due to the passage of a seed between the photoresponsive transistor and the light source.

A significant problem which arises with the use of this type of sensor is that dirt and dust on and around the planting equipment may accumulate on or around the sensing components. Thus, the amount of light normally incident upon the photosensitive element in the absence of a seed may be decreased significantly. Such a decrease may result in the change in signal level produced in response to the passing seeds becoming insufficient to energize or signal the following circuit components. Whatever arrangement is chosen for the following circuit some minimum change in the sensor signal input must be chosen and maintained at which the circuit will respond to produce an output signal or indicator of seed passage to indicate the operation of the seed planting apparatus.

In U.S. Pat. No. 3,723,989 to Fathauer et al, a feedback circuit is provided between the output of the photoresponsive element and the light source. This feedback circuit is arranged to increase the current supplied to the light source for increasing the illumination provided thereby in response to a change in the photosensitive element output signal due to the build up of dirt or the like in the light path. Thus, the change in signal output of the photosensitive element responsive to a seed is substantially maintained in the presence of such build up, at least within the capabilities of the light source to increase its output illumination.

OBJECTS AND SUMMARY OF THE INVENTION

It is an important object of this invention to provide a seed sensor embodying new and improved means for maintaining a given minimum change in output signal level in response to a given change in light level produced by the passage of a seed, irrespective of accumulation of dust, dirt or the like in the optical path.

A more specific object of this invention is to provide a seed sensor of the type described which is relatively simple and efficient in operation yet adds but nominally to the cost of producing the seed sensor circuitry.

Briefly, a seed sensor for detecting the passage of seeds along a predetermined path of travel, according to this invention, comprises a light source optically exposed to said path of travel, a photosensitive element optically exposed to said path of travel for receiving light from said light source and circuit means for effecting from said photosensitive element the emission of an electrical signal responsive to light incident thereon and producing a change in said signal in response to momentary change in the light level incident thereon due to the passage of a seed through the light, said circuit means including means for maintaining said change in the electrical signal at a given minimum level corresponding to a given momentary change in light level substantially independent of changes in the intensity of light emitted from said light source or received by said photosensitive element due to the presence or accumulation of dirt, dust or the like.

BRIEF DESCRIPTION OF THE DRAWING

The invention, both as to its structure and mode of operation will be better understood by reference to the following detailed description and the accompanying drawings forming a part thereof, wherein:

FIG. 3 is a perspective view, partially broken away illustrating an exemplary seed sensor in accordance with this invention; and FIG. 4 is a circuit schematic diagram of a sensor circuit embodying this invention.

DETAILED DESCRIPTION OF THE ILLUSTRATED EMBODIMENT

Figure 1:
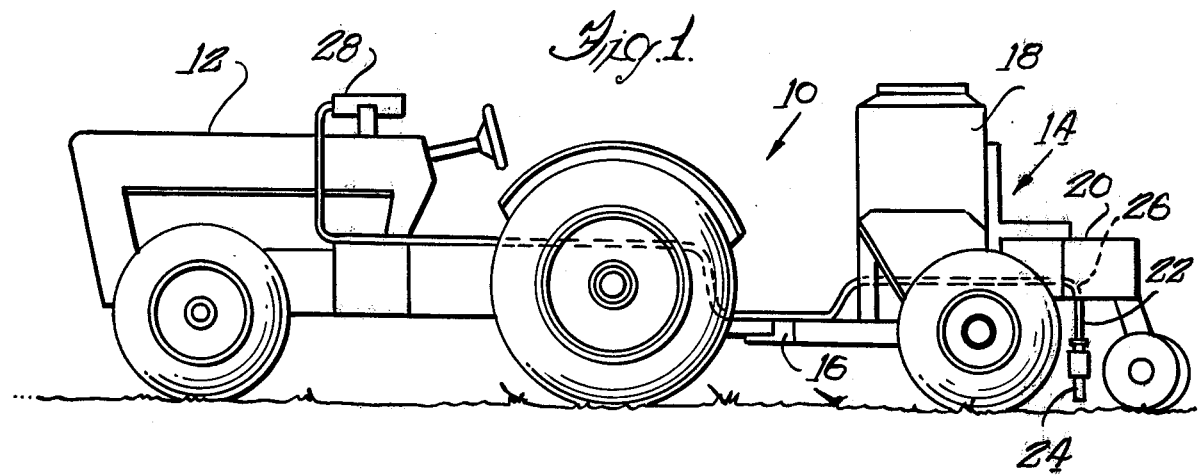
FIG. 1 is a diagrammatic representation of a seed planting machine and tractor wherein the improved sensor of this invention is advantageously utilized.

Referring now to the drawings, and initially to FIG. 1, there is shown a seed planting apparatus designated generally 10 which includes a vehicle, such as a tractor 12, coupled to a multiple row seed planter 14 by means of a towbar 16. The seed planter includes one or more hoppers such as the hopper 18 which hold a quantity of seeds to be planted. A seed planting mechanism 20 is positioned to dispense seeds from the hopper 18 to a plurality of seed delivery tubes or conduits 22, each associated with a row to be planted. A seed sensor 24 embodying the present invention is associated with each of the seed delivery tubes or conduits 22 so as to allow the seeds to pass through the seed sensor 24 prior to bring delivered to the ground. Output signals developed within each seed sensor 24, as will be more fully described hereinafter, are fed over a suitable wire or cable 26 to a monitor console 28 located at the tractor 12 for convenient viewing by an operator. The monitor console 12 may include a number of circuit elements in conjunction with suitable display or readout devices to allow to the operator to monitor the functioning of the seed planter, in response to the signals delivered thereto from the sensors 24.

Figure 2:
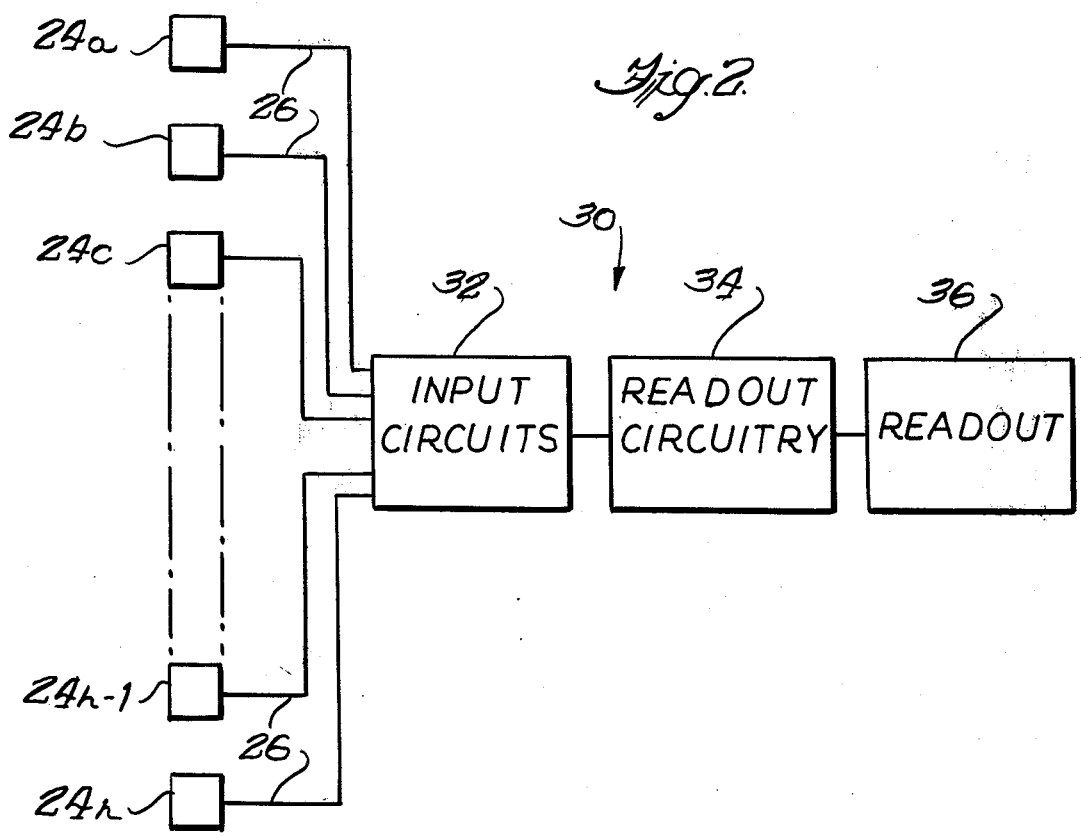
FIG. 2 is a block diagram of a plurality of sensors according to this invention associated with monitoring and readout circuitry.

As best seen in FIG. 2, a plurality of sensors 24a through 24n associated with the multiple seed delivery tubes 22 of the multi-row planter 14 are each joined by a suitable wire 26 to the monitoring console circuitry designated generally 30. The circuits 30 may generally include input circuits 32 for converting the sensor signals delivered thereto on the lines 26 to a suitable form for use in the following circuits. Readout and logic circuitry 34 receives the signal from the input circuits and drives a readout or display panel 36 to provide suitable indications to the operator of the continued delivery of seeds through the conduits 22. The monitoring console circuitry 30 may take various forms, for example, to indicate seed presence or absence, to maintain a count of seeds being delivered, or to individually monitor the seed delivery conduits 22. However, this circuitry forms no part of the present invention, and therefore will not be described in further detail herein.

Attention is now invited to FIG. 3 wherein a preferred embodiment of a seed sensor assembly 24 with which the present invention may be advantageously utilized is illustrated. The sensor assembly 24 is formed of first and second housing halves 38 and 40 joined together generally as indicated at the line 42 by suitable means such as plastic welding, epoxy adhesive, or the like. An inlet port or orifice 44 is defined at the top end of the joined housing halves 38, 40 for connection with one of the seed delivery conduits 22 for receiving the seeds therefrom. Similarly, at the bottom of the housing halves 38, 40 an outlet port or orifice 46 is defined having a relatively long nozzle-like structure for directing the seeds therethrough to the ground to be planted. Each of the housing halves 38 and 40 includes a component receiving compartment 48 and 50. It will be seen that each of the component receiving compartments 48 and 50 includes in an inner wall portion, 52, 54 which together form a continuation of the inlet and outlet orifices 44 and 46 to define a substantially tubular passageway 56 through the sensor assembly 24. The wall portion 52 is provided with a suitable mounting port or window 58 for receiving a light source such as a light emitting diode 60 which is thereby optically exposed to the passageway 56. Similarly, the wall portion 54 is provided with a pair of mounting ports or windows 62, 64 for receiving a photosensitive element such as photoresponsive transistors 66, 68, also optically exposed to the passageway 56 in optical alignment with the light emitting diode 60. Also mounted within the component receiving compartment 48 is a circuit board 70 for receiving electronic circuit components comprising a sensor circuit 76. The connecting cable 26 for delivering power to the light emitting diode 60 and sensor circuit 76, and for receiving signals from the sensor circuit 76 is fed through an opening 72 provided therefor in a housing half 48. In the preferred embodiment illustrated in FIG. 3, suitable transparent protective portions 74 and 75 extend over the exposed surfaces of the light emitting diode 60 and photoresponsive transistors 66 and 68 within the passageway 56.

While a preferred embodiment of the sensor assembly 24 has been shown and described herein, it will be understood that the embodiment illustrated is exemplary only, the elements of the present invention being equally useful in conjunction with any suitably constructed sensor assembly including a seed passageway and a light source and light sensitive elements optically exposed to said seed passageway.

Referring now to FIG. 4, the light emitting diode 60 and photoresponsive transistors 66 and 68 are each associated with an identical sensor circuit, designated generally 76 and 76a. The light emitting diode 60 has its anode connected in series with a suitable current limiting resistor 78 to a source of positive potential and its cathode electrode connected with ground. Illumination produced by the energized light emitting diode 60 impinges upon the base electrodes of the photoresponsive transistors 66 and 68 as indicated diagrammatically by the arrows 80. The phototransistors 66 and 68 each have a collector electrode fed from a suitable source of positive potential whereby a current is produced at the respective emitter electrodes thereof proportional to the intensity of light falling upon them from the light emitting diode 60.

In accordance with the present invention diodes 82 and 84 are provided and respectively have an anode electrode connected with the emitter electrode of one of the photo transistors 66 and 68 and a cathode electrode connected with ground. Thus, the current produced at the emitter electrodes of the photo transistors 66 and 68 produces a voltage across the respective diodes 82 and 84. The voltages are then buffered by operational amplifiers 86 and 88 having noninverting inputs connected with the respective emitter electrodes of the photo transistors 66 and 68, and their outputs fed back to their respective inverting inputs. The buffer voltages are applied to voltage divider circuits comprising resistors 90 and 92 and resistors 94 and 96, respectively. Capacitors 98 and 100 maintain a constant voltage across the respective resistors 92 and 96, which voltage forms an input signal to the noninverting input of respective operational amplifiers 102 and 104. The operational amplifiers 102 and 104 have their respective inverting inputs fed from the outputs of the operational amplifiers 86 and 88. The outputs of the operational amplifiers 102 and 104 are delivered via respective series connected resistors 106 and 108 to the base electrode of a transistor 110 whose emitter electrode is grounded and whose collector electrode is joined to the cable 26 for delivering the sensor signal to the monitor circuits 30. A capacitor 112 is provided in a feedback loop between the collector electrode of the transistor 110 and the base electrode thereof.

It will be appreciated from the foregoing description that the passage of a seed through the passageway 56 will block a portion of the light incident upon the base electrode of one or both of the phototransistors 66 and 68, thus producing a momentary reduction in the current delivered at the emitter electrode thereof. This in turn will produce a momentary change in the voltage across the respective diode 82 and 84 which is buffered by the operational amplifiers 86 and 88 delivered to the respective operational amplifiers 102 and 104. If this momentary voltage change is greater than a given minimum value comprising the initial DC voltage across the respective resistors 90 and 94, then the associated operational amplifier 102 or 104, will momentarily go "high" or produce a logic "1" at its output. The transistor 110 will be driven into conduction, thereby inverting the logic to momentarily produce a logic "0" indicative of a passing seed, at its output or collector electrode, to be delivered by the line 26 to the monitor circuits 30.

It should be noted that the inclusion of the diodes 82 and 84, as described, in the foregoing circuit provides a unique compensation to eliminate the effects of dirt or dust or the like accumulating which may decrease the light transmission between the light emitting diode 60 and phototransistors 66 and 68. In particular, the provision of the respective diodes 82 and 84 assures the production of the required minimum voltage change at the respective emitter electrodes of the phototransistors 66 and 68 in response to a given momentary change in light level due to the passage of a seed, irrespective of changes in the light level or intensity incident upon the phototransistors in the absence of a seed.

The following is believed to be a correct explanation of the function of the diodes 82 and 84 in this regard. The terms utilized in the following discussion are defined as follows: VD is the voltage across the diode, ID is the current through the diode produced by the associated phototransistor, IR is the reverse leakage current of the diode, K is the physical constant associated with the diode and X is the ratio of the light intensity present on the phototransistor when a seed is present, to the light intensity on the phototransistor with no seed present. (Therefore, (1=X) times 100 is the percent of light blocked by the seed.) In general, the voltage produced across a diode by a current applied thereto is given by the equation VD=Kln(ID/IR). This defines the voltage produced across the diode by the phototransistor current ID when no seed is present. With a seed present, blocking (1−X) 100 percent of the light, the voltage across the diode becomes momentarily Kln(XID/IR). Thus, the voltage change ΔV across the diode responsive to the passage of the seeds is given by the equation $$\Delta V = K\ln(ID\text{-}IR) - K\ln(XID\text{-}IR) = K\ln ID - K\ln IR - K\ln XID + K\ln IR$$

or $$\Delta V = K\ln ID - K\ln XID = K\ln ID = K\ln ID - K\ln X,$$

$$\Delta V = K\ln X$$

Therefore, the change in voltage across the diode which forms the signal delivered to the respective operational amplifier 102 or 104 is independent of the original current ID through the diode responsive to the original light intensity present upon the phototransistor. Even in the presence of dirt, dust or the like blocking a substantial percentage of the transmission of light between the light emitting diode 60 and responsive phototransistors 66 and 68, a seed passing therethrough and blocking a given percent of the available light will produce the same voltage change as if there had been no dirt or the like present and fully 100% of the light transmitted from the LED 60 is received at the phototransistors 66 and 68 in the absence of a seed. Consequently, the resistors 90 and 92, 94 and 96 and capacitors 98 and 100 need only be chosen to set a minimum voltage level for response of the operational amplifiers 102 and 104, corresponding to the minimum "X" factor, or light blocking to be expected from a passing seed. When this value is set, the proper response is obtained from each passing seed, irrespective of changes in the ambient light level caused by accumulation of dirt or dust or the like.

While a specific embodiment of the invention has been shown and described herein it will be understood that variations and modifications may be effected without departing from the spirit and scope of the invention as defined by the appended claims.

The invention is claimed as follows:

1. In combination with a field seed planter having seed delivery conduit means associated with each row to be planted, seed sensor associated with each said conduit means comprising means forming a path of travel for the passage of seeds therethrough prior to said seed being planted, a source of light optically exposed to said path of travel and a light sensitive means optically exposed to said path of travel and to said light source for receiving light from said light source, and circuit means for effecting from said light sensitive means the emission of an electrical signal responsive to light incident thereon and a momentary change in said signal responsive to a momentary change in light level incident thereon due to passage of a seed between said light source and said light sensitive means, said circuit means including means coupled with said light sensitive means for maintaining a said momentary change in electrical signal substantially at a predetermined minimum value corresponding to said change in light level incident upon said light sensitive means, substantially regardless of any change of the level of light transmitted by said light source or received by said light sensitive means due to accumulation of dirt, dust or the like.

2. A seed sensor according to claim 1 wherein said light source comprises a light emitting diode.

3. A seed sensor according to claim 2 wherein said light sensitive element comprises a photoresponsive transistor.

4. A seed sensor according to claim 3 wherein said last mentioned means in said circuit means comprises a diode having an anode electrode connected with an emitter electrode of said photoresponsive transistor and a cathode electrode connected with ground.

5. A seed sensor according to claim 1 wherein said light sensitive means comprises a plurality of photoresponsive transistors spaced across said path of travel and said last mentioned means comprises a plurality of diodes, each having an anode electrode joined to an emitter electrode of one of said photoresponsive transistors and a grounded cathode electrode.

* * * * *

UNITED STATES PATENT AND TRADEMARK OFFICE
CERTIFICATE OF CORRECTION

PATENT NO. : 4,166,948
DATED : September 4, 1979
INVENTOR(S) : David E. Steffen

It is certified that error appears in the above-identified patent and that said Letters Patent are hereby corrected as shown below:

Column 2, line 56 change "bring" to --being--;

Column 4, line 50 insert --and-- after "88" and before "delivered";

Column 5, line 16 change the formula to read: --(1-X)--;

Column 5, after line 25, change the formula to read:
$$\Delta V = K\ln(ID/IR) - K\ln(XID/IR) =$$
$$K\ln ID - K\ln IR - K\ln XID + K\ln IR";$$

Column 5, after line 30, change the formula to read:
$$\Delta V = K\ln ID - K\ln XID = K\ln ID - K\ln ID - K\ln X,$$
$$\Delta V = -K\ln X";$$

Column 5, line 42 change "responsive" to --respective--.

Signed and Sealed this

Twenty-ninth Day of January 1980

[SEAL]

Attest:

SIDNEY A. DIAMOND

Attesting Officer      Commissioner of Patents and Trademarks